United States Patent
Chiang et al.

(10) Patent No.: US 11,321,450 B2
(45) Date of Patent: May 3, 2022

(54) ONLINE STATIC SECURITY ASSESSMENT UNDER THE QSS MODEL

(71) Applicant: Bigwood Technology, Inc., Ithaca, NY (US)

(72) Inventors: Hsiao-Dong Chiang, Ithaca, NY (US); Xiaozhe Wang, Montréal (CA); Na Dong, Tianjin (CN); Ningqiang Jiang, Nanjing (CN)

(73) Assignee: Bigwood Technology, Inc., Ithaca, NY (US)

( * ) Notice: Subject to any disclaimer, the term of this patent is extended or adjusted under 35 U.S.C. 154(b) by 551 days.

(21) Appl. No.: 16/508,683

(22) Filed: Jul. 11, 2019

(65) Prior Publication Data
US 2021/0014261 A1    Jan. 14, 2021

(51) Int. Cl.
*G06F 21/50* (2013.01)
*G06F 21/81* (2013.01)
(Continued)

(52) U.S. Cl.
CPC ............. *G06F 21/50* (2013.01); *G06F 21/81* (2013.01); *H04L 63/1433* (2013.01); *G05B 19/042* (2013.01); *G05B 2219/2639* (2013.01)

(58) Field of Classification Search
CPC ..... G06F 21/50; G06F 21/81; H04L 63/1433; H04L 63/0227; G05B 19/042; G05B 19/0426; G05B 2219/2639
See application file for complete search history.

(56) References Cited

U.S. PATENT DOCUMENTS

| 5,629,862 A | * | 5/1997 | Brandwajn | ............... H02J 3/00 706/915 |
| 2003/0140880 A1 | * | 7/2003 | Kahlon | ................... B60L 50/16 123/179.3 |

(Continued)

FOREIGN PATENT DOCUMENTS

| CN | 106558879 A | * | 4/2017 | |
| CN | 110556800 A | * | 12/2019 | ............... H02H 7/26 |

OTHER PUBLICATIONS

Gholami et al., "Static security assessment of power systems: A review". International Transactions on Electrical Energy Systems. vol. 30, Issue 9. (Year: 2020).*

*Primary Examiner* — Sarah Su
(74) *Attorney, Agent, or Firm* — Tong J. Lee

(57) ABSTRACT

An online static security assessment (SSA) method based on a quasi steady-state (QSS) model is applied to a power system. An input to the method includes a post-contingency state of the power system for each of a set of contingencies. The following operations are performed for each contingency. Using the QSS model of the post contingency state of the power system, a steady-state voltage magnitude is calculated for each bus in the power system by solving a system of equations. The system of equations is formulated according to a time-domain stability model of the power system and includes nonlinear differential algebraic equations (DAE) with continuous and discreet variables. The derivative terms of short-term state variables in the DAE are set to zero. The method compares the calculated voltage magnitude with a limit, classifies each contingency as secure, critical or insecure, and determines a control action in response to the classification.

20 Claims, 6 Drawing Sheets

(51) Int. Cl.
*H04L 29/06* (2006.01)
*G05B 19/042* (2006.01)

(56) References Cited

U.S. PATENT DOCUMENTS

| | | | |
|---|---|---|---|
| 2014/0257715 A1* | 9/2014 | Chiang | G01R 21/133 |
| | | | 702/34 |
| 2016/0087566 A1* | 3/2016 | Sun | H02J 3/00 |
| | | | 700/287 |
| 2020/0036748 A1* | 1/2020 | Tebekaemi | H04L 63/1408 |
| 2020/0050159 A1* | 2/2020 | Chiang | G05B 19/042 |

* cited by examiner

| Insecure Contingencies | Corrective Control | Preventive Control |
|---|---|---|
| C1 | Corrective Action for C1 | Preventive Action for C1 |
| C2 | Corrective Action for C2 | Preventive Action for C2 |
| ⋮ | ⋮ | ⋮ |
| Cm | Corrective Action for Cm | Preventive Action for Cm |

| Critical Contingencies | Corrective Control |
|---|---|
| C(m+1) | Corrective Action for C(m+1) |
| C(m+2) | Corrective Action for C(m+2) |
| ⋮ | |
| C(m+n) | Corrective Action for C(m+n) |

Memory 310

FIG. 3

PF-based SSA

| Loading | 14-bus system | | 145-bus system | |
|---|---|---|---|---|
| | Number of Voltage Mis-classifications | Number of Overload Mis-classifications | Number of Voltage Mis-classifications | Number of Overload Mis-classifications |
| Light | 1 | 0 | 7 | 5 |
| Base case | 1 | 1 | 8 | 6 |
| Heavy | 2 | 4 | 12 | 8 |

FIG. 5A

QSS-based SSA

| Loading | 14-bus system | | 145-bus system | |
|---|---|---|---|---|
| | Number of Voltage Mis-classifications | Number of Overload Mis-classifications | Number of Voltage Mis-classifications | Number of Overload Mis-classifications |
| Light | 0 | 0 | 0 | 0 |
| Base case | 0 | 0 | 0 | 0 |
| Heavy | 0 | 0 | 0 | 0 |

FIG. 5B

ONLINE STATIC SECURITY ASSESSMENT UNDER THE QSS MODEL

TECHNICAL FIELD

Embodiments of the invention pertain to the online static security assessment (SSA) of a power system.

BACKGROUND

North America Electric Regulatory Council (NERC) defines power system security as the ability to prevent cascading outages when the bulk power grid is subjected to severe disturbances. The specific criteria for satisfying power system security are set by individual reliability councils. Each council establishes the types of disturbances that its system must withstand without cascading outages. The following conditions, although conservative in nature, can ensure that cascading outages do not occur. (I) When any of a specified set of disturbances occurs, the system will survive the ensuing transient and move into a steady-state condition. (II) No bus voltage magnitudes during transients may move outside their permissible ranges. (III) In the new steady-state condition, no equipment, transmission lines, or control devices are overloaded and no bus voltage magnitudes may come to rest outside their permissible ranges (e.g., within 5% of nominal). Moreover, contingencies occurring in a power system can cause serious consequences within such a short time period that operators cannot take action fast enough, once the process has started. Because of this aspect of system operation, online static security assessment (SSA) is adopted to examine possible system consequences before they arise and alarm the operators whether or not condition (III) is satisfied.

There is a conflict between the accuracy of the model used and the speed required for online SSA. To meet the fast speed requirement for online SSA, the SSA may be performed by approximate but fast algorithms such as a direct-current (DC) power flow method, a distribution factor method, an iterative linear alternating-current (AC) power-flow (PF) method, or an improved fast approximate method. Using high-performance computers, some energy management centers run AC real-time contingency analysis to identify voltage violations and overload every 4-5 minutes.

However, with the increasing penetration of intermittent energy resources (e.g., wind, photovoltaics, etc.), the aging infrastructure, and the restructuring of electricity markets as well as the need for cost reduction, modern electric power systems are seeking to capitalize on their existing facilities, gradually pushing the system closer to its operating limits and security boundaries. The current practice of performing PF-based SSA often produces incorrect assessment results during heavy loading conditions Taking the steady state of the time-domain (TD) model as the benchmark, studies have shown that as the loading condition of a power system increases, the difference between the PF solutions and the benchmark also increases. Because of the striking differences, PF-based SSA may misclassify insecure contingencies as being secure, and secure contingencies as being insecure. Therefore, there is a need to re-examine the SSA methods for heavy loading conditions to avoid misclassifications.

SUMMARY

In one embodiment, a method is provided for securely operating a power system. The method comprises obtaining an input including a post-contingency state of the power system for each of a set of contingencies. For each contingency, the following operations are performed. The operations include: calculating, using the QSS model of the post-contingency state of the power system, a steady-state voltage magnitude for each of a set of buses in the power system. To calculate the steady-state voltage magnitude, a system of equations is solved. The system of equations is formulated according to a time-domain stability model of the power system and includes a set of nonlinear differential algebraic equations (DAE) with continuous and discrete variables. The derivative terms of short-term state variables in the DAE are set to zero. The operations for each contingency further include: comparing voltage magnitude at each bus with a corresponding voltage limit; based on at least results of the comparing the voltage magnitude, classifying the contingency as one of: secure, critical and insecure; determining a control action in response to the classifying of the contingency as critical or insecure; and storing the determined control action for each contingency in a memory. In response to runtime occurrence of a given one of the contingencies in the power system, a stored control action is retrieved for the given contingency from the memory to change an operating state of the power system.

In another embodiment, a computer system is provided for performing the aforementioned method. The computer system includes one or more processors and one or more memory devices. The one or more processors are operative to perform the aforementioned method for securely operating a power system.

In yet another embodiment, a non-transitory computer readable storage medium is provided. The non-transitory computer readable storage medium includes instructions that, when executed by a computing system, cause the computing system to perform the aforementioned method for securely operating a power system.

Other aspects and features will become apparent to those ordinarily skilled in the art upon review of the following description of specific embodiments in conjunction with the accompanying figures.

BRIEF DESCRIPTION OF THE DRAWINGS

FIG. 3 is a diagram illustrating control actions stored in a memory according to one embodiment.

FIG. 5A is a table illustrating the number of misclassifications by a PF-based SSA according to one embodiment.

FIG. 5B is a table illustrating the number of misclassifications by a QSS-based SSA according to one embodiment.

DETAILED DESCRIPTION

Figure 1:
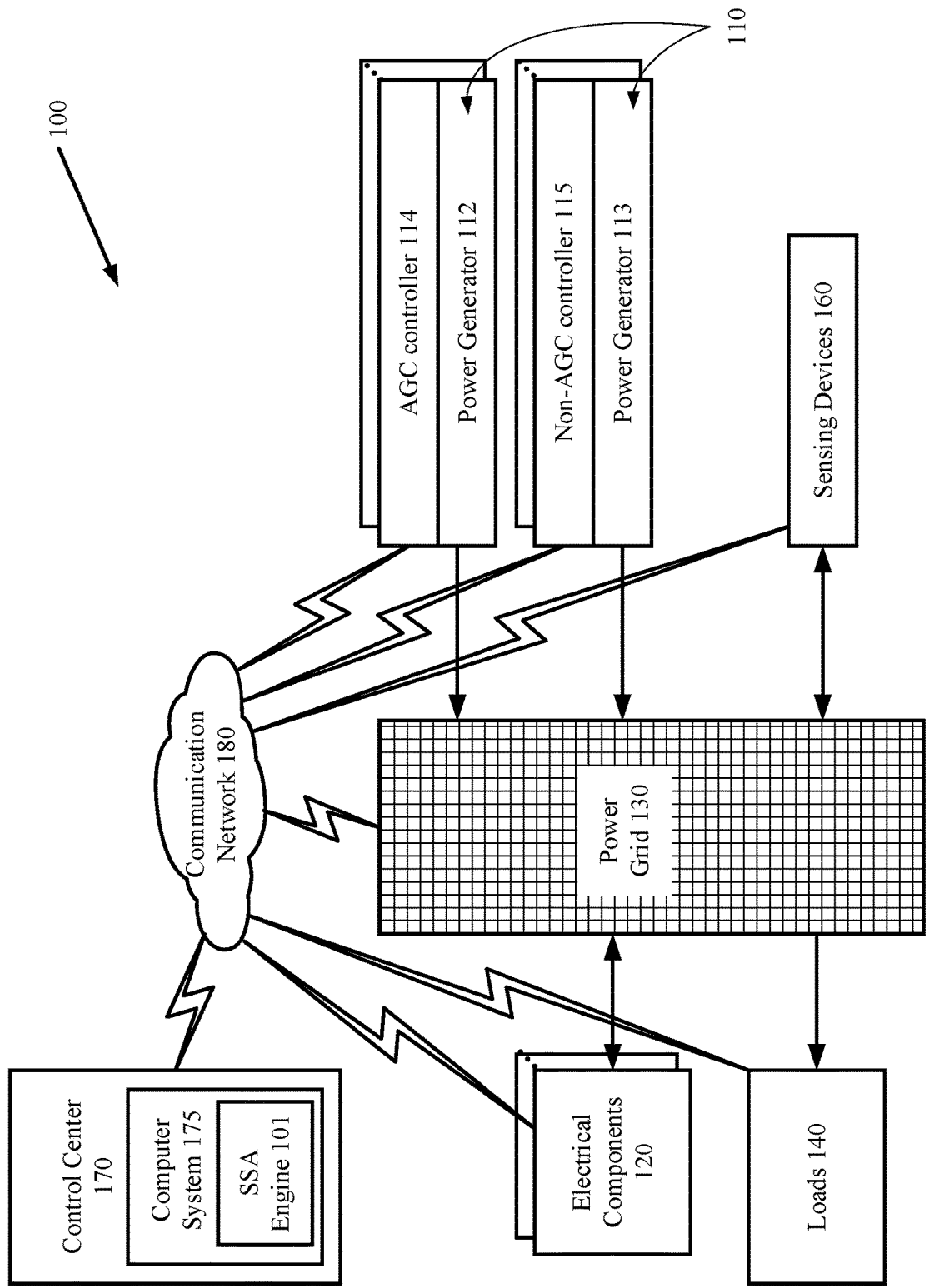
FIG. 1 illustrates a power system in which embodiments of the invention may operate.

In the following description, numerous specific details are set forth. However, it is understood that embodiments of the invention may be practiced without these specific details. In other instances, well-known techniques have not been shown in detail to prevent obscuring the understanding of this description. Someone skilled in the art will appreciate the fact that the invention may be practiced without such specific details. Those of ordinary skill in the art, with the included descriptions, will be able to implement appropriate functionality without undue experimentation.

In the following disclosure, the terms "power source" and "power generator" are equivalent and may be used interchangeably. The terms "online" and "real-time" are used interchangeably. The terms "branch" and "line" are used interchangeably. Moreover, static security assessment (SSA) according to a power flow (PF) model is referred to as the PF-based SSA, and SSA according to a quasi steady-state (QSS) model is referred to as the QSS-based SSA.

A brief overview of SSA is provided below. SSA detects whether all relevant static constraints of a post-contingency steady-state system are satisfied within their limits, such as voltage violation or branch overload. A list of credible contingencies is provided as input to SSA for the assessment. A contingency is an unplanned outage in one or more devices, such as transmission lines, generators, and transformers, or abrupt changes in loads. Given a contingency, a common practice is to perform an AC PF-based SSA method on the post-contingency system, aiming to capture the steady state of the post-contingency system to detect any violations in voltage and in branch flow. In some studies, a set of simplified PF equations is employed to achieve fast analysis results at the expense of accuracy.

If the post-contingency steady-state system has a violation in voltage or a branch flow, then the contingency is classified as an insecure contingency. If a contingency causes near one or more near-violations (according to a predetermined metric) in voltage or branch flows, then the contingency is classified as a critical contingency. A contingency is secure if it is not an insecure contingency or a critical contingency. A preventive control action may be taken for the base case system such that an insecure contingency becomes a secure contingency. Additionally or alternatively, a corrective action may be taken for the post-contingency system after an insecure contingency or a critical contingency occurs.

A time-domain (TD) model is generally used in the power industry to simulate power system dynamic behaviors. The steady state of the ensuing post-contingency TD trajectory can accurately capture the system post-contingency steady state. In the following description, the steady state of the ensuing trajectory of the TD model is used as a benchmark to examine the accuracy of SSA according to the PF model and the QSS model.

The long-term stability model for a power system is large and involves different time scales, thus its TD simulation is expensive in terms of computational efforts and data processing. In contrast, the QSS model is a good compromise between accuracy and efficiency. By assuming that fast variables are infinitely fast and are stable in the long term, the QSS model replaces the differential equations of short-term dynamics by their equilibrium equations.

According to our studies, misclassifications in SSA often occur in the PF-based approach. As an example, we examined the IEEE 14-bus system under a heavy loading condition (e.g., $\lambda=1.1$) and the base case with a line 1-5 outage. The corresponding post-contingency PF solution is considerably different from the simulated TD trajectory at bus4. In particular, according to the TD model, the contingency causes a voltage violation and is classified as insecure, while the same contingency is classified as secure according to the PF model. Further studies show that the number of misclassifications by the PF-based SSA increases when the loading increases. Some of our experiment results are provided below in connection with FIG. 5A, FIG. 5B and FIG. 6.

This disclosure describes three types of misclassifications: missed alarm (MA), false alarm (FA) and missed/false violation (MFV). The most undesirable one is a missed alarm; i.e., an insecure contingency is classified as secure. A false alarm occurs when a secure contingency is classified as insecure. A missed/false violation occurs when the SSA correctly identifies some violations caused by an insecure contingency, but at the same time misses some violations or falsely identifies some violations of the same contingency. We found that the PF-based SSA is prone to all these three types of misclassifications especially under a heavy loading condition.

In our experiments, a loading condition is classified as heavy if its normalized load margin is 15% or less. With increasing loading conditions, misclassifications by the PF-based SSA become more severe, especially for the MA-type misclassification, while the QSS-based SSA produces no misclassifications.

The QSS-based SSA is described in the following. The general dynamic power system model for stability analysis can be described as a set of nonlinear differential algebraic equations (DAE) with continuous and discrete variables:

$$0 = g(x, y, z_c, z_d) \tag{1}$$

$$\frac{dx}{dt} = f(x, y, z_c, z_d) \tag{2}$$

$$\frac{dz_c}{d\tau} = h_c(x, y, z_c, z_d) \tag{3}$$

$$z_d(k+1) = h_d(x, y, z_c, z_d(k)) \tag{4}$$

where g, f and $h_c$ are continuous functions and $h_d$ is a discrete function; g in (1) represents system network algebraic functions and describes the static behaviors of passive devices; f in (2) describes the short-term dynamic functions of synchronous machines, their automatic voltage regulators (AVR), and the interconnecting transmission network together with induction and synchronous motor loads, as well as other devices such as a high-voltage direct-current (HVDC) converter and static VAR compensator (SVC); and vectors x, y are the corresponding short-term variables and the algebraic variables, respectively. Equation (3) describes long-term dynamics, including exponential recovery loads, over-excitation limiters (OXL), and turbine governors (TG), and (4) describes the long-term discrete events such as load tap changers (LTC). $z_c$ and $z_d$ are the continuous and discrete long-term state variables, respectively. $\tau=\varepsilon t$ and $1/\varepsilon$ are the maximum time constants among devices.

A power system may be modeled in a range of time scales. The term "short-term" herein refers to a short time scale, which is usually in the range of a few seconds to a few tens of seconds (e.g., within 30 seconds). Typically, dynamics of the short-term variables settle down within a short time (e.g., within 30 seconds); however, the short-term variables may continue to vary not due to their differential equations but due to variations of other types of variables such as mid-term variables and instantaneous variables. Examples of short-term state variables include the generator excitation system variables and the generator internal angles. In contrast, the term "long-term" refers to a range of time from a few minutes or longer. In one embodiment, the short-term state variables include the internal angle and frequency of synchronous machines, their AVR, and the interconnecting transmission network together with induction and synchronous motor loads, as well as other devices such as HVDC converters and SVCs.

The QSS model is derived from time-scale decomposition and aims to offer an appropriate tradeoff between speed and accuracy in simulating trajectories. If the short-term dynamics are stable and settle down infinitely fast in the long-term time scale, then the corresponding equilibrium equations take the place of (2) and we have the following QSS model:

$$0 = g(x, y, z_c, z_d) \quad (5)$$

$$0 = f(x, y, z_c, z_d) \quad (6)$$

$$\frac{dz_c}{d\tau} = h_c(x, y, z_c, z_d) \quad (7)$$

$$z_d(k+1) = h_d(x, y, z_c, z_d(k)) \quad (8)$$

On the other hand, the PF model only focuses on the power flow balance under static network constraints, described by the power flow equation:

$$0 = g(y) \quad (9)$$

The PF model captures the power flow balance, ignoring dynamic behaviors and the internal constraints of short-term and long-term state variables. Overlooking the counter effects between dynamic devices makes the PF model too simplified to reflect the real power system steady state after a contingency. Thus, there exist considerable differences between the solutions of the PF model and those of the TD model.

The QSS model provides an accurate approximation of the TD model in terms of the $\omega$-limit set under a set of assumptions (S1, S2 and S3) described below:

S1. Neither the TD model nor the QSS model meets the singularity points.

S2. The trajectories of the TD model, the QSS model, and the transient stability models with specified initial conditions exist and are unique. Additionally, $D_{z_c}$ is compact.

S3. The equilibrium point of the transient stability model is continuous in $z_c$ when $z_d$ are fixed as parameters.

As the SSA focuses on the post-contingency steady-state system without involving the transient process, the QSS model can be used for online SSA in power system control centers with high accuracy and computational efficiency.

Next, the computational procedure for QSS-based SSA is described. In the QSS model, the dynamic behavior of fast variables can be regarded as infinitely fast in a long-term time scale and can be replaced by their equilibrium equations (6). And, as LTC changes are typical events that result in discrete dynamics captured by (8), transitions of $z_d$ depend on system variables, thus $z_d$ change values from $z_d(k-1)$ to $z_d(k)$ at distinct times $\tau_k$ where k=1, 2, 3 . . . N; otherwise, these variables remain constants. Therefore, the QSS model (5)-(8) can be considered as two decoupled systems (12) and (13) shown below. When $z_d$ change:

$$z_d(k) = h_d(x, y, z_c, z_d(k-1)) \quad (12)$$

system (13) works with fixed parameter $z_d$:

$$\frac{dz_c}{d\tau} = h_c(z_c, z_d(k), x, y) \quad (13)$$

-continued $$0 = f(z_c, z_d(k), x, y)$$

$$0 = g(z_c, z_d(k), x, y)$$

Therefore, when we run the QSS model for SSA, discrete variables $z_d$ are updated first at each distinct time, and then system (13) works with frozen parameters $z_d$ before their next change, and the simulation stops until the simulation time is reached. By solving the system of equations (5)-(8) according to the QSS model, the steady-state voltage magnitude for each bus and the line flow at each line in the power system can be obtained.

After explaining the mathematical formulation of the QSS model, a system for performing the QSS-based SSA is described below. Operations that utilize the SSA output for securely operating a power system are also described.

FIG. 1 illustrates an example of a power system 100 in which embodiments of the invention may operate. The power system 100 includes multiple power generators 110 and electrical components 120 (such as shunt capacitors, transformers, converters, etc.), all of which are coupled to a power grid 130 that includes power transmission lines and power distribution lines. In some embodiments, the power system 100 may also include renewable power generators (e.g., solar power generators, wind power generators, etc.) and multiple power storage devices (e.g., batteries) coupled to the power grid 130. Although the embodiment of FIG. 1 includes specific types of power generators, it is understood that the aforementioned QSS-based SSA can be applied to a power system with any types of generators, which may include more or fewer types of generators shown in FIG. 1. In one embodiment, the power generators 110 may be located in power plants and/or distributed across a geographic area. Electrical loads 140, such as customers, receive electrical power via the power grid 130.

The power generators 110 may include AGC-controlled power generators 112 and non-AGC-controlled power generators 113. The operation of each power generator 112 is controlled by an AGC controller 114, which, according to a target set point of system frequency, adjusts the power generation of the power generator 112. The operation of each power generator 113 is controlled by a non-AGC controller 115, which, according to a given target power output, adjusts the power output of the power generator 113. The power system 100 also includes sensing devices 160 monitoring the power output of the power generators 110 and the renewable power generators 150, as well as measuring thermal conditions and voltage levels at a number of locations across the power system 100.

The power system 100 also includes a control center 170 where operators of the power system 100 control the power system operations. An operator in the control center 170 may monitor the system status, and run computer programs on a computer system 175 to control the system operations, which include but are not limited to: adjustments to generators' real power outputs, adjustments to load demands, adjustments to the network topology in the power grid 130, and adjustments of generators' terminal voltage, shunt capacitors, transformer taps, among other things.

In one embodiment, the computer system 175 is in communication with the devices or components of the power system 100 via a communication network 180. The communication network 180 may be a propriety wide-area network or a public network such as the Internet protected with data encryption capabilities. In one embodiment, the generators 110, the electrical components 120, the power grid 130 and the loads 140 are modeled as buses and lines in a power system analysis.

Figure 2:
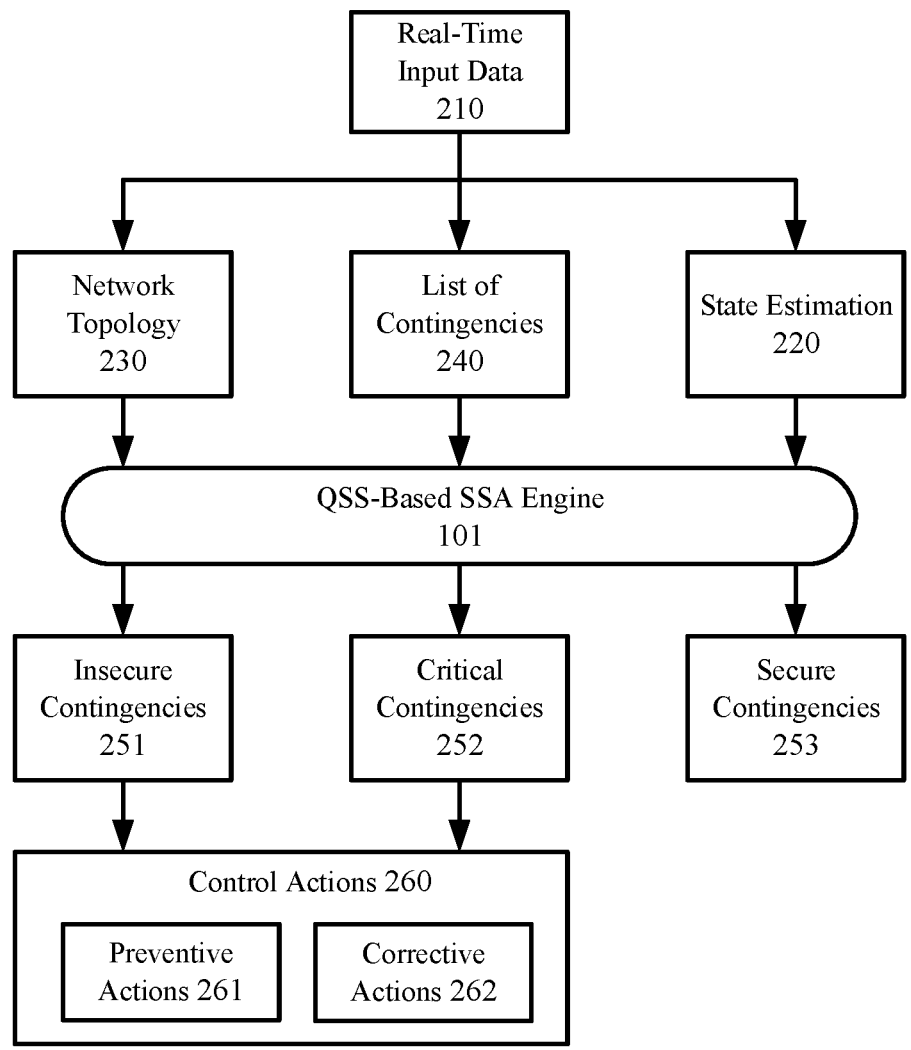
FIG. 2 is a diagram illustrating an overview of operations performed by a computer system for securely operating a power system according to one embodiment.

FIG. 2 is a diagram illustrating an overview of operations performed by the computer system 175 for securely operating the power system 100 according to one embodiment. Referring also to FIG. 1, the computer system 175 receives real-time input data 210; e.g., from a Supervisory Control and Data Acquisition (SCADA) system, which collects real-time data through sensors such as the sensing devices 160 of FIG. 1. From the real-time input data 210, the computer system 175 calculates an estimation of the current state (i.e., current state estimation 220) and an analysis of the network topology 230 of the power system 100. The calculated information along with a list of credible contingencies 240 are applied to a QSS-based SSA engine 101, which classifies each contingency in the list 240 by solving the system of equations (5)-(8).

The QSS-based SSA engine 101 performs the aforementioned QSS-based SSA, periodically or on demand, to classify each contingency as insecure 251, critical 252, or secure 253. Based on the classification, the computer system 175 calculates and determines control actions 260 including preventive actions 261 and corrective actions 262 for the insecure contingencies 251 and the critical contingencies 252.

To remove the line flow violations, control actions 260 such as adjustments of generator real power outputs, load demand adjustments and transmission line switching (so that the network topology is altered) are effective. To remove bus voltage violations, control actions 260 such as adjustments of generator terminal voltage, shunt capacitors, transformer tap, are effective. Other control actions 260 for controlling power generation, delivery and/or load demand may also be executed.

Overloads may occur as the result of a sudden increase in system demand, the unexpected outage of a generator or a transmission line, or a failure in any of the system components. When overloads occur, an online corrective action 262 is executed to quickly relieve the overloads before severe damage to the system occurs. The corrective actions 262 correct the power system operating point so that all of the violations are removed and the speed and accuracy requirements for an online application can be achieved. In some embodiments, a preventive action 261 may be executed before any overload occurs.

In one embodiment, the SSA engine 101 may be implemented by software stored in a non-transitory machine-readable medium readable and executable by the computer system 175. The computer system 175 has access to a memory or a data storage device, including but not limited to, dynamic random access memory (DRAM) memory devices, hard drives, solid-state drives (SSDs), etc.

In one embodiment, a computer program when executed by a computer (e.g., the computer system 175), causes the computer to perform a method of the QSS-based SSA.

FIG. 3 is a diagram illustrating the control actions 260 stored in a memory 310 according to one embodiment. As mentioned in connection with FIG. 2, when the computer system 175 classifies a contingency as an insecure contingency by performing the QSS-based SSA 250, the computer system 175 also identifies the corresponding control action, such as a corrective action for restoring the secure system operations. In some embodiments, the computer system 175 may also identify a preventive action for preventing the contingency from happening. When the computer system 175 classifies a contingency as a critical contingency by performing the QSS-based SSA 250, the computer system 175 also identifies a corresponding control action, such as a corrective action for steering the system away from the near-insecure condition. The memory 310 is in the computer system 175 or otherwise accessible to the computer system 175. Storing the control actions 260 in the memory 310 allows the computer system 175 to retrieve the predetermined corresponding control action quickly when a given contingency occurs.

Figure 4:
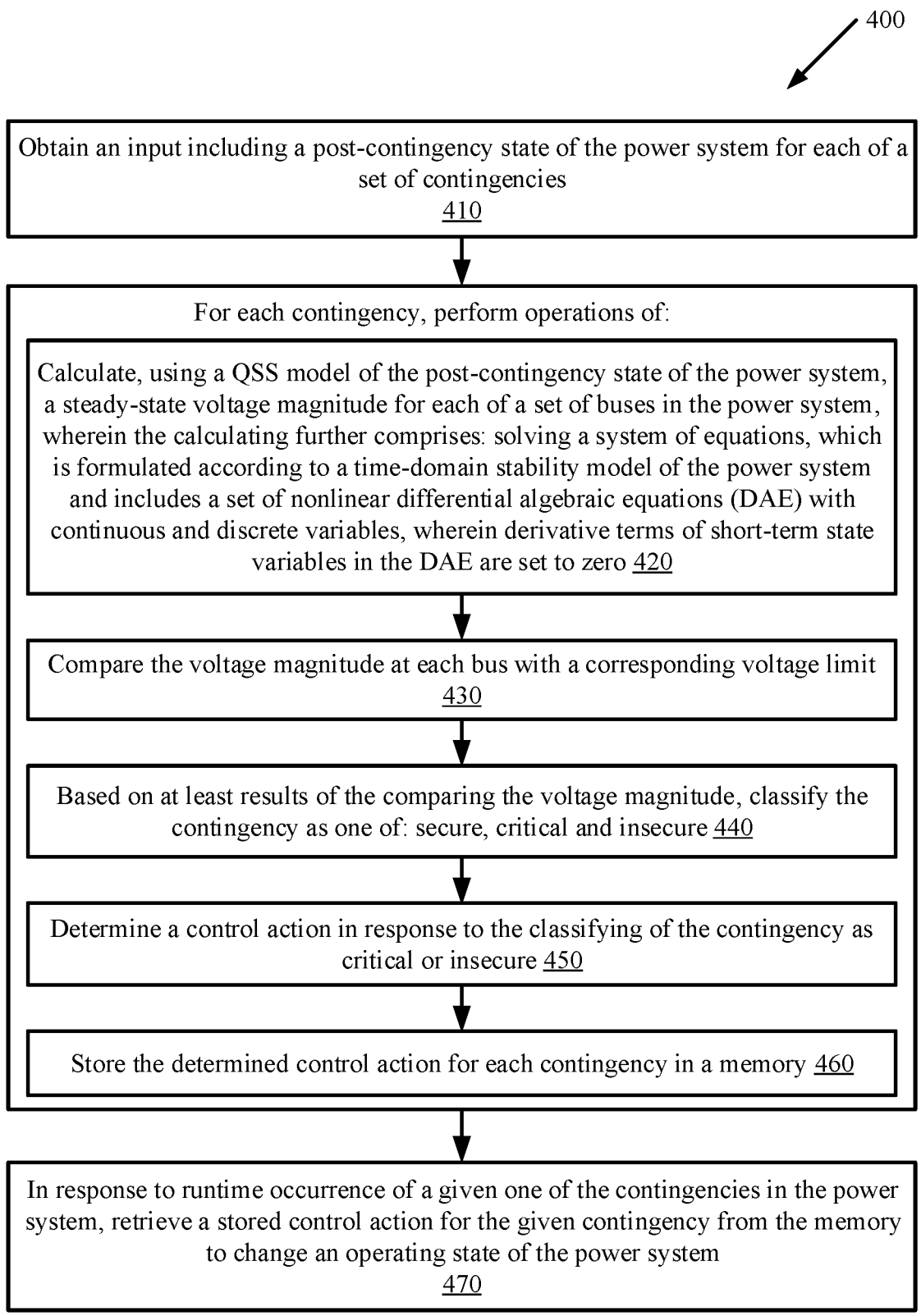
FIG. 4 is a flow diagram illustrating a method for securely operating a power system according to one embodiment.

FIG. 4 is a flow diagram illustrating a method 400 for securely operating a power system (e.g., the power system 100 of FIG. 1) according to one embodiment. The method 400 may be performed by a computer system; e.g., the computer system 175 in the control center 170 of FIG. 1, and/or the computer system 700 of FIG. 7.

The method 400 begins at step 410 with the computer system obtaining an input including a post-contingency state of the power system for each of a set of contingencies. For each contingency, the computer system performs the following operations. At step 420, the computer system calculates, using the QSS model of the post-contingency state of the power system, a steady-state voltage magnitude for each of a set of buses in the power system. To calculate the steady-state voltage magnitude, the computer system solves a system of equations, which is formulated according to a time-domain stability model of the power system and includes a set of nonlinear differential algebraic equations (DAE) with continuous and discrete variables. According to the QSS model, the derivative terms of short-term state variables in the DAE are set to zero. At step 430, the computer system compares the voltage magnitude at each bus with a corresponding voltage limit. Based on at least the results of the comparing the voltage magnitude, the computer system at step 440 classifies the contingency as secure, critical or insecure. At step 450, the computer system determines a control action in response to the classification of the contingency as critical or insecure. At step 460, the computer system stores the determined control action for each contingency in a memory. At step 470, in response to runtime occurrence of a given one of the contingencies in the power system, the computer system retrieves a stored control action for the given contingency from the memory to change an operating state of the power system.

After obtaining the input of the post-contingency state of the power system at step 410, the computer system may perform further operations for each contingency. The further operations may include the computer system calculating, using the QSS model of the post-contingency state of the power system, a steady-state line flow for each of a set of lines in the power system. The line flow at each line is compared with a corresponding line-flow limit. Based on at least results of the comparing the line flow, the computer system classifies the contingency as secure, critical or insecure.

In one embodiment, the given contingency is classified as an insecure contingency when the voltage magnitude of at least a bus or the line flow of at least a line in the power system has exceeded a respective limit. In one embodiment, the control action for the insecure contingency prevents or removes a violation of the respective limit by adjusting generation, delivery or demand of electric power in the power system. In one embodiment, the given contingency is classified as a critical contingency when the voltage magnitude of at least a bus or the line flow of at least a line in the power system is within a predetermined vicinity of and has not reached a respective limit. In one embodiment, the control action for the critical contingency removes a violation of the respective limit by adjusting generation, delivery or demand of electric power in the power system after the given contingency occurs.

Using the steady state of TD simulation as the benchmark, we numerically evaluated the accuracy of SSA based on the PF model and the QSS model. As the loading conditions increase, we have observed that misclassifications in SSA become more pronounced and can be serious in the PF-based SSA, while misclassifications in QSS-based SSA do not occur in test systems under both light and heavy loading conditions. This observation persists when load variations and generation re-dispatch patterns are taken into account during increases in loading conditions.

FIG. 5A is a table illustrating the number of misclassifications by the PF-based SSA according to one embodiment. FIG. 5B is a table illustrating the number of misclassifications by the QSS-based SSA according to one embodiment. The light loading, base case loading and heaving loading conditions correspond to $\lambda=0.9$, 1.0 and 1.1, respectively. The two tables show that the QSS-based SSA has no misclassifications in all three loading conditions, while the PF-based SSA has large numbers of misclassifications, especially for heaving loading.

Figure 6:
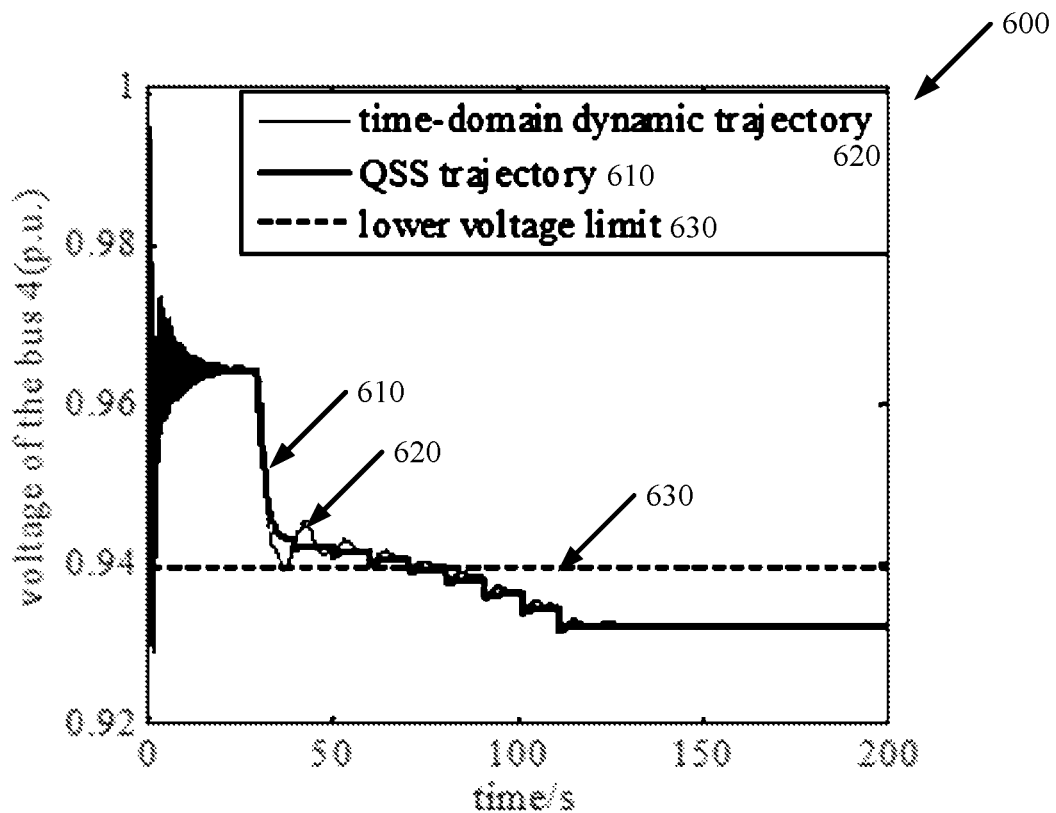
FIG. 6 is a diagram illustrating a comparison between a QSS trajectory and a TD trajectory according to one embodiment.

FIG. 6 is a diagram 600 illustrating a comparison between a QSS trajectory 610 and a TD trajectory 620 according to one embodiment. The diagram 600 shows that the QSS trajectory 610 closely tracks the simulated TD trajectory 620 at bus4 in the IEEE 14-bus system under a heavy loading condition (e.g., $\lambda=1.1$) and the base case with a line 1-5 outage. This result shows that the TD trajectory can be approximated by the QSS trajectory. This result also shows that the QSS-based SSA can correctly assess whether the voltage magnitude at bus4 has breached the lower voltage limit 630, and to thereby classify the corresponding contingency. Further experiments numerically confirm the accuracy of QSS-based SSA during both light and heavy loading conditions.

We also numerically observe that the QSS model is on the order of one magnitude faster than the TD model. Due to the parallelizable nature of contingencies, recent progress in high-performance computing and commercial availability of graphics processing units (GPUs) and parallel computing infrastructures enable the applicability of QSS-based SSA in the online environment.

We observe that the QSS model takes only about 5%-10% of the computational load of the TD model. Moreover, with recent progress in accessible high-performance computing, the separate contingencies can be assigned to more than one processor to reduce the required computation time.

Figure 7:
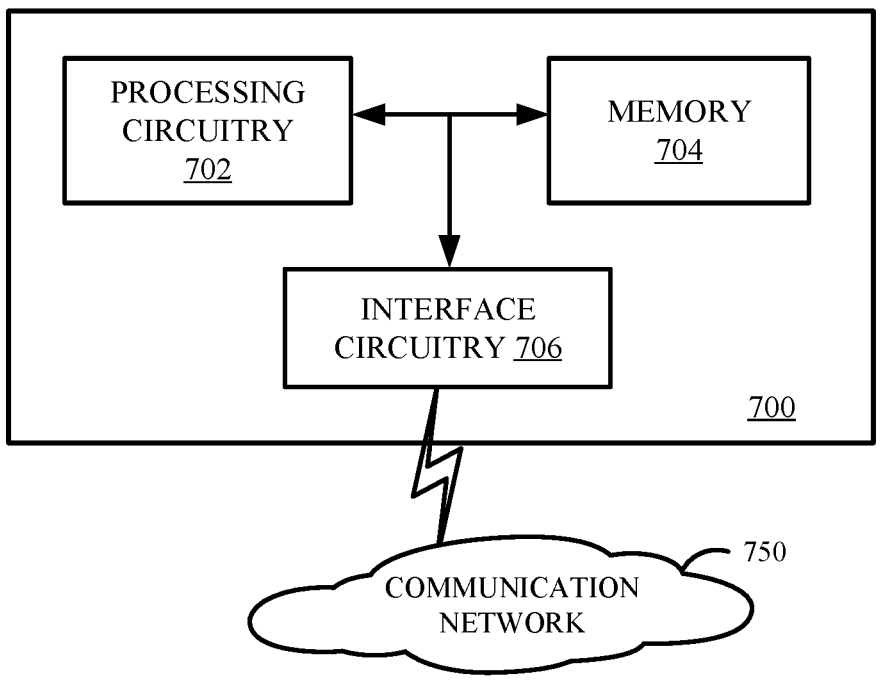
FIG. 7 is a block diagram of a computer system according to one embodiment.

FIG. 7 is a diagram of a computer system 700 according to one embodiment. The computer system 700 may be a server computer, a multi-processor computer, or any machine capable of executing a set of instructions (sequential or otherwise) that specify actions to be taken by that machine. While only a single machine is illustrated, the term "machine" shall also be taken to include any collection of machines (e.g., computers, processors and cores) that individually or jointly execute a set (or multiple sets) of instructions to perform any one or more of the methodologies discussed herein. In one embodiment, the computer system 700 includes circuitry which further includes processing circuitry 702, a memory 704, and interface circuitry 706. The interface circuitry 700 can include at least one input port and at least one output port. The memory 704 contains instructions executable by the processing circuitry 702 whereby the computer system 700 is operable to perform the various embodiments as described herein, including the method 400 of FIG. 4. In one embodiment, a part or all of the data and code for performing the various embodiments described herein may be received over a communication network 750 via the network interface device 706.

Embodiments may be represented as a software product stored in a machine-readable medium (such as the non-transitory machine-readable storage media, also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read-only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

While the invention has been described in terms of several embodiments, those skilled in the art will recognize that the invention is not limited to the embodiments described and can be practiced with modification and alteration within the spirit and scope of the appended claims. The description is thus to be regarded as illustrative instead of limiting.

What is claimed is:

1. A method for securely operating a power system, comprising:
    obtaining an input including a post-contingency state of the power system for each of a set of contingencies;
    for each contingency, performing operations of:
        calculating, using a QSS model of the post-contingency state of the power system, a steady-state voltage magnitude for each of a set of buses in the power system, wherein the calculating further comprises: solving a system of equations, which is formulated according to a time-domain stability model of the power system and includes a set of nonlinear differential algebraic equations (DAE) with continuous and discrete variables, wherein derivative terms of short-term state variables in the DAE are set to zero;
        comparing the voltage magnitude at each bus with a corresponding voltage limit;
        based on at least results of the comparing the voltage magnitude, classifying the contingency as one of: secure, critical and insecure;
        determining a control action in response to the classifying of the contingency as critical or insecure; and
        storing the determined control action for each contingency in a memory; and
    in response to runtime occurrence of a given one of the contingencies in the power system, retrieving a stored control action for the given contingency from the memory to change an operating state of the power system.

2. The method of claim 1, further comprising:
    for each contingency, performing further operations of:
        calculating, using the QSS model of the post contingency state of the power system, a steady-state line flow for each of a set of lines in the power system;

comparing the line flow at each line with a corresponding line-flow limit; and based on at least results of the comparing the line flow, classifying the contingency as one of: secure, critical and insecure.

3. The method of claim 2, further comprising:
solving a system of equations according to the QSS model to obtain voltage magnitudes of the buses and lines flows of the lines in the power system.

4. The method of claim 2, wherein the given contingency is classified as an insecure contingency when the voltage magnitude of at least a bus or the line flow of at least a line in the power system has exceeded a respective limit.

5. The method of claim 4, wherein the control action for the insecure contingency prevents or removes violation of the respective limit by adjusting generation, delivery or demand of electric power in the power system.

6. The method of claim 2, wherein the given contingency is classified as a critical contingency when the voltage magnitude of at least a bus or the line flow of at least a line in the power system is within a predetermined vicinity of, and has not reached, a respective limit.

7. The method of claim 6, wherein the control action for the critical contingency removes violation of the respective limit by adjusting generation, delivery or demand of electric power in the power system after the given contingency occurs.

8. The method of claim 1, wherein the input is real-time data including at least an estimation of a current system state and network topology of the power system.

9. The method of claim 1, wherein the set of nonlinear differential algebraic equations (DAE) includes:
a first equation, which describes static behaviors of passive devices in the power system;
a second equation, which describes short-term dynamic functions of synchronous machines, automatic voltage regulators (AVR), an interconnecting transmission network, induction and synchronous motor loads, and other devices in the power system;
a third equation, which describes long-term dynamics; and
a fourth equation, which describes long-term discrete events.

10. The method of claim 9, wherein the derivative terms in the second equation are set to zero.

11. A computer system for securely operating a power system, comprising:
memory; and
one or more processors operative to:
obtain an input including a post-contingency state of the power system for each of a set of contingencies;
for each contingency, perform operations of:
calculating, using a QSS model of the post-contingency state of the power system, a steady-state voltage magnitude for each of a set of buses in the power system, wherein the calculating further comprises: solving a system of equations, which is formulated according to a time-domain stability model of the power system and includes a set of nonlinear differential algebraic equations (DAE) with continuous and discrete variables, wherein derivative terms of short-term state variables in the DAE are set to zero;
compare the voltage magnitude at each bus with a corresponding voltage limit;

based on at least results of the comparing the voltage magnitude, classify the contingency as one of: secure, critical and insecure;
determine a control action in response to the classifying of the contingency as critical or insecure; and
store the determined control action for each contingency in the memory; and
in response to runtime occurrence of a given one of the contingencies in the power system, retrieve a stored control action for the given contingency from the memory to change an operating state of the power system.

12. The computer system of claim 11, wherein the one or more processors for each contingency are further operative to:
calculate, using the QSS model of the post contingency state of the power system, a steady-state line flow for each of a set of lines in the power system;
compare the line flow at each line with a corresponding line-flow limit; and
based on at least results of the comparing the line flow, classify the contingency as one of: secure, critical and insecure.

13. The computer system of claim 12, wherein the given contingency is classified as an insecure contingency when the voltage magnitude of at least a bus or the line flow of at least a line in the power system has exceeded a respective limit.

14. The computer system of claim 13, wherein the control action for the insecure contingency prevents or removes violation of the respective limit by adjusting generation, delivery or demand of electric power in the power system.

15. The computer system of claim 12, wherein the given contingency is classified as a critical contingency when the voltage magnitude of at least a bus or the line flow of at least a line in the power system is within a predetermined vicinity of, and has not reached, a respective limit.

16. The computer system of claim 15, wherein the control action for the critical contingency removes violation of the respective limit by adjusting generation, delivery or demand of electric power in the power system after the given contingency occurs.

17. The computer system of claim 11, wherein the input is real-time data including at least an estimation of a current system state and network topology of the power system.

18. The computer system of claim 11, wherein the set of nonlinear differential algebraic equations (DAE) includes:
a first equation, which describes static behaviors of passive devices in the power system;
a second equation, which describes short-term dynamic functions of synchronous machines, automatic voltage regulators (AVR), an interconnecting transmission network, induction and synchronous motor loads, and other devices in the power system;
a third equation, which describes long-term dynamics; and
a fourth equation, which describes long-term discrete events,
wherein the derivative terms in the second equation are set to zero.

19. A non-transitory computer-readable storage medium including instructions that, when executed by a computing system, cause the computing system to perform a method for securely operating a power system, the method comprising:
obtaining an input including a post-contingency state of the power system for each of a set of contingencies;

for each contingency, performing operations of:
- calculating, using a QSS model of the post-contingency state of the power system, a steady-state voltage magnitude for each of a set of buses in the power system, wherein the calculating further comprises: solving a system of equations, which is formulated according to a time-domain stability model of the power system and includes a set of nonlinear differential algebraic equations (DAE) with continuous and discrete variables, wherein derivative terms of short-term state variables in the DAE are set to zero;
- comparing the voltage magnitude at each bus with a corresponding voltage limit;
- based on at least results of the comparing the voltage magnitude, classifying the contingency as one of: secure, critical and insecure;
- determining a control action in response to the classifying of the contingency as critical or insecure; and
- storing the determined control action for each contingency in a memory; and
- in response to runtime occurrence of a given one of the contingencies in the power system, retrieving a stored control action for the given contingency from the memory to change an operating state of the power system.

20. The non-transitory computer-readable storage medium of claim 19, wherein the instructions when executed by the computing system, cause the computing system to perform the method which further comprises:
- calculate, using the QSS model of the post contingency state of the power system, a steady-state line flow for each of a set of lines in the power system;
- compare the line flow at each line with a corresponding line-flow limit; and
- based on at least results of the comparing the line flow, classify the contingency as one of: secure, critical and insecure.

* * * * *